(12) United States Patent
Schmitz (10) Patent No.: US 11,223,714 B2
(45) Date of Patent: Jan. 11, 2022

(54) TELECOMMUNICATION TERMINAL AND METHOD FOR CONTROLLING MEDIA STREAMS

(71) Applicant: Unify Patente GmbH & Co. KG, Munich (DE)

(72) Inventor: Ulrich Schmitz, Würselen (DE)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 16/635,388

(22) PCT Filed: Aug. 14, 2018

(86) PCT No.: PCT/EP2018/072069
§ 371 (c)(1),
(2) Date: Jan. 30, 2020

(87) PCT Pub. No.: WO2019/034669
PCT Pub. Date: Feb. 21, 2019

(65) Prior Publication Data
US 2020/0186633 A1  Jun. 11, 2020

(30) Foreign Application Priority Data
Aug. 16, 2017  (DE) .......................... 102017118724.3

(51) Int. Cl.
*H04M 1/247* (2021.01)
*G06F 3/16* (2006.01)
(Continued)

(52) U.S. Cl.
CPC .......... *H04M 1/2473* (2013.01); *G06F 3/165* (2013.01); *G10L 15/22* (2013.01); *G10L 15/26* (2013.01);
(Continued)

(58) Field of Classification Search
CPC combination set(s) only.
See application file for complete search history.

(56) References Cited

U.S. PATENT DOCUMENTS 9,736,429 B1 * 8/2017 Huang ................ H04L 65/105
2007/0183400 A1 * 8/2007 Bennett .............. H04M 1/2535
370/352

(Continued)

FOREIGN PATENT DOCUMENTS

| CN | 101399568 A | 4/2009 |
| CN | 103873711 A | 6/2014 |
| EP | 1816830 A1 | 8/2007 |

OTHER PUBLICATIONS

International Preliminary Report on Patentability for PCT/EP2018/072069 dated Feb. 18, 2020.
(Continued)

*Primary Examiner* — Phung-Hoang J Nguyen
(74) *Attorney, Agent, or Firm* — Buchanan Ingersoll & Rooney PC (57) ABSTRACT

A terminal can have at least one audio interface for at least one microphone, at least one audio interface for at least one speaker, an operator control module and at least one interface for connecting to at least one telephony- and/or IP-telephony-compatible terminal. The terminal can be configured as a media hub for the at least one telephony- or IP-telephony-compatible terminal. The terminal can have a media processing unit for mixing and a media hub controller or controlling media streams received by the at least one telephony- or IP-telephony-compatible terminal and the at least one telephony- or IP-telephony-compatible terminal can be operated through the operator control module of the telecommunication terminal. A method for controlling
(Continued)

media streams through a media hub controlled integrated into a telecommunication terminal is also disclosed.

20 Claims, 4 Drawing Sheets (51) Int. Cl.
*G10L 15/22* (2006.01)
*H04M 1/253* (2006.01)
*G10L 15/26* (2006.01)

(52) U.S. Cl.
CPC ....... *H04M 1/2471* (2013.01); *H04M 1/2535* (2013.01); *H04M 2250/02* (2013.01); *H04M 2250/06* (2013.01)

(56) References Cited

U.S. PATENT DOCUMENTS

| | | | |
|---|---|---|---|
| 2007/0286178 A1 | 12/2007 | Kakiuchi et al. | |
| 2009/0116563 A1* | 5/2009 | Kawamura | H04N 7/152 375/240.26 |
| 2010/0114896 A1* | 5/2010 | Clark | H04W 76/00 707/741 |
| 2010/0260173 A1* | 10/2010 | Johnson | H04L 65/102 370/356 |
| 2012/0062689 A1* | 3/2012 | Sai | H04N 7/15 348/14.09 |
| 2012/0233146 A1* | 9/2012 | Kruglick | G06F 16/9535 707/706 |
| 2013/0342631 A1* | 12/2013 | Garfio | H04N 21/43637 348/14.01 |
| 2015/0006222 A1* | 1/2015 | Isherwood | G06Q 10/1097 705/7.21 |
| 2017/0046411 A1* | 2/2017 | D'Souza | G06F 40/30 |
| 2017/0195495 A1* | 7/2017 | Deora | H04M 1/2757 |
| 2017/0235740 A1* | 8/2017 | Seth | H04L 67/10 707/738 |

OTHER PUBLICATIONS

International Search Report for PCT/EP2018/072069 dated Sep. 27, 2018 (German).
Written Opinion of the International Searching Authority for PCT/EP2018/072069 dated Sep. 27, 2018 (German).

* cited by examiner

TELECOMMUNICATION TERMINAL AND METHOD FOR CONTROLLING MEDIA STREAMS

CROSS-REFERENCE TO RELATED APPLICATIONS

The present application is the U.S. national stage application of International Patent Application No. PCT/EP2018/072069, filed on Aug. 14, 2018, which claims priority to German Patent Application No. 10 2017 118 724.3, filed Aug. 16, 2017.

FIELD

The invention relates to a telecommunication apparatus, a telecommunication terminal and a method for controlling media streams through a media hub processor integrated into a telecommunication terminal.

BACKGROUND

In offices and other work environments or workplaces, telephones are the central communication device on each desk. In addition to the telephone services received using a regular analog or ISDN telephone, workplaces today are also increasingly using IP (Internet Protocol) telephony, which allows telephone calls to be made via computer networks. This uses VoIP applications, for example, which are installed and running on desktop or laptop computers, for example. It is common for VoIP or Video-over-IP clients on desktop or laptop computers to be used in addition to the desktop telephone. Both the desktop telephone and the computer are frequently connected to add-on hands-free equipment with Digital Enhanced Cordless Telecommunications (DECT) headsets, which automatically switch between telephone and PC mode.

However, headphones or headsets often have poor audio quality and are also annoying to the user, because he must wear them more or less constantly.

SUMMARY

An objective for embodiments of this invention is therefore to provide a telephone communication terminal that functions as an audio source and an audio sink, so that, for example, VoIP conversations received on a computer are output through the speaker of the telecommunication terminal and the need for additional headphones is eliminated.

Accordingly, embodiments of the present invention provides a telecommunication terminal, in particular a telephone, with at least one audio interface with at least one microphone, at least one audio interface with at least one speaker, an operator control module, and at least one interface for connecting to at least one telephony- and/or IP-telephony-compatible terminal, wherein the telecommunication terminal is configured as a media hub for the at least one telephony- or IP-telephony-compatible terminal, wherein the telecommunication terminal has a media processing unit for mixing and a media hub controller for controlling media streams received by the at least one telephony- or IP-telephony-compatible terminal, and wherein the at least one telephony- or IP-telephony-compatible terminal can be operated through the operator control module of the telecommunication terminal.

With embodiments of the telecommunication terminal according to the invention, which is configured in particular as a telephone, its higher-quality speaker can also be used to output audio streams from telephony- or IP-telephony-compatible terminals used in parallel, without requiring additional headsets, redundant speakers or microphones, which reduces the overall cost. For example, a VoIP telephone conversation can be conducted via a desktop or laptop computer through the speaker of the telephone with very good sound quality. According to the invention, the telephone is equipped with a media hub controller and therefore acts as a universal media hub with overlapping media hub functionality, while still being able to operate as a normal telephone (e.g., SIP telephone). The hardware and software add-ons required for this, in particular the media hub controller and the media processing unit with corresponding software, are integrated into the telephone. Media streams can be controlled universally through the media hub, wherein the telephone acts as media source and media sink, with which various terminals, such as a PC or smart phone, can be connected. Media streams, e.g., audio streams, can flow into the telephone or out from it in the direction of terminals connected or connectable to it. Examples of connected audio sources/sinks can be smart phones, tablet PCs, or PC workstations or laptops. Headphones can also be connected to the telephone according to the invention. It should be noted that not just one but rather multiple terminals can be connected to the telephone at the same time. The telephone according to the invention then controls or directs all connected audio sources or audio sinks and decides which media or audio stream from which terminal will be processed in what way (e.g., mixed by the media processing unit or forwarded by the media hub controller).

It is particularly advantageous that the operator control module of the telephone basically acts as a remote control for the telephony- or IP-telephony compatible terminals used in parallel with it, because they are controlled by the input field of the operator control module. In this regard, the operator control module can be expanded so that through it the user can control, for example, which terminal acts as media sink and which as media source. For example, the operator control module includes a graphic touch-screen input field with a corresponding menu structure, through which the user controls these media sources and media sinks.

According to one preferred embodiment, the media hub controller controls media streams, in particular audio streams or video streams, for output through the audio output to at least one speaker and/or for output to at least one telephony- or IP-telephony compatible terminal via the interface. In addition to audio and video streams, the media hub controller is configured to control any other type of media streams, such as text messages, for example.

According to an additional preferred embodiment, the media hub controller is LAN- and/or W-LAN- and/or USB- and/or Bluetooth-compatible, so that a universal media or audio source and media or audio sink is created.

Preferably, the media processing unit is configured to mix media streams, and so that the media processing unit is also equipped with a transcriber function for converting audio streams to text data. The media processing unit is also configured to be universally operated. The transcriber function is generally possible as soon as a connected terminal is active. For example, if a smart phone that is paired with the telephone makes an active call and directs that audio stream to the telephone, then an additional terminal connected to the telephone, such as a PC or laptop, can receive that audio stream through the telephone and record and/or transcribe it, i.e., convert it into text form. This can be done in such a way, for example, that a key on the telephone designated for that purpose is pressed during a call, in response to which the telephone then forwards the mixed audio stream to the connected terminal or to multiple connected terminals, where it is recorded and/or transcribed. The recorded file can be archived with all connection details of the conversation, which also come from the telephone. The transcription can be done using an additional transcriber feature (e.g., Nuance NDEV or Google Speech), and the generated text can be filed or stored in the recording archive with the connection details in addition to the recording. The transcriber function is especially advantageous for disabled people, because the spoken text from the other party (the received audio stream) can be displayed on the PC or laptop screen in text form. This makes it easier in particular for deaf or hearing-impaired people to communicate via telephone.

It is further advantageous if the media hub controller is controllable via the operator control module of the telephone.

It is likewise advantageous if the media hub controller can be configured using the operator control module.

Embodiments of the telecommunication terminal configured as a telephone can be a VoIP-, SIP-, or WebRTC-compatible telephone. In order to use WebRTC services, such as cloud services, to conduct telephone conferences via Intranet/Internet (e.g., Circuit), the telecommunication terminal can be equipped with expanded functionality. For this, the telecommunication terminal or telephone is first used, as described above, as a "sound device," i.e., to output an audio stream, which is received by a connected terminal. However, in addition, the telephone can also sign on as a "user" (e.g., Circuit user) of a cloud communication service in the corresponding cloud with the telephone owner's access data (e.g., Circuit cloud). Then the telephone will also ring for calls from the telecommunication platform located in the cloud, although the connected PC or laptop has no active session (e.g., Circuit session). This makes it easier for the telephone user to join or not to miss a conversation through the telecommunication platform because the corresponding PC or laptop through which it normally would take place is not active. The telephone can therefore ring for cloud-based calls (e.g., through Circuit), as it would for VoIP or SIP calls, and it can also be operated easily, using the telephone's operator control module for normal acceptance of the conversation, hanging up, placing on hold, etc. According to one embodiment, the telephone can have a screen on which other address information is displayed for a cloud-based call (e.g., the Circuit conversation name with an indication that it is now a Circuit WebRTC call, which can be shown by a corresponding symbol, for example). In the event that the user then also starts a cloud-based session (e.g., a Circuit session) on his PC, laptop, smart phone, or similar device, then he also sees a display indicating that an active Circuit RTC session is already running; this can also be controlled in parallel from the PC, laptop, or smart phone.

Advantageously, the interface is a USB and/or Bluetooth and/or Intranet and/or LAN and/or W-LAN interface in some embodiments.

The at least one telephony-compatible or IP-telephony-compatible terminal can be a computer, smart phone, and/or laptop that can be connected to the telephone through the interface, wherein media hub software is installed on the telephony-compatible or IP-telephony-compatible terminal.

Embodiments of a method for controlling media streams through a media hub controller integrated into a telecommunication terminal are also provided. Embodiments of the method can include the following steps: connection of at least one telephony- or IP-telephony-compatible terminal with the telecommunication terminal via an interface; receipt of media streams from the at least one telephony- or IP-telephony-compatible terminal to the telecommunication terminal, control of the received media streams using the media hub controller to forward the media streams to at least one audio output of the telecommunication terminal, so that the media streams are output through one of the speakers connected to the audio output, and control of the at least one telephony- or IP-telephony-compatible terminal through the operator control module of the telecommunication terminal. The invented method offers all of the advantages described above.

Additional features, tasks, advantages and details of the present invention will become more apparent from the following description of specific exemplary embodiments and their representation in drawings in the included figures. It is understood that features, tasks, advantages and details of individual exemplary embodiments are transferable to other exemplary embodiments and are considered to be disclosed also in connection with the other exemplary embodiments unless this is obviously inapplicable for technical or physical reasons. Accordingly, features of various exemplary embodiments can fundamentally be combined with other exemplary embodiments and the combination can also be considered an exemplary embodiment of the invention.

BRIEF DESCRIPTION OF THE DRAWINGS

The invention is described below in more detail based on preferred exemplary embodiments and with reference to the figures. The figures show.

REFERENCE NUMERALS USED IN THE DRAWINGS INCLUDE

1 Telecommunication terminal/telephone
2, 2' Smart phone
3 Bluetooth connection
4 Laptop
5 USB connection
6 PC
7 Internet
8 LAN/WLAN connection
9 Media hub controller
10 Telephone receiver
11 Speaker
12 Audio interface
13 Audio interface
14 Audio interface
15 Audio interface
16 Operator control module
17 Screen
18 Media processing unit
19 Telephone unit
20 Circuit controller unit
21 Media sources
22 LAN controller & driver 23 USB controller & driver
24 Bluetooth controller & driver
25 Media sinks
26 LAN controller and driver
27 USB controller and driver
28 Bluetooth controller and driver
29 Media hub driver
30 Sound system
31 Cloud transcription service
32 Media hub extension software
33 Incoming call (smart phone)
34 Ring tone
35 Transcription session
36 Media hub transcriber service
37 Audio data (external audio)
38 Call details (smart phone)
39 Archive file
40 Transcribed items
41 Monitor
42 Order to end
43 Virtual sound driver on the PC
44 WebRTC service
45 WebRTC browser
46 WebRTC controller
47 SIP telephone/VoIP/PBX
48 Headphones/Headset
49 Microphone

DETAILED DESCRIPTION

Figure 1:
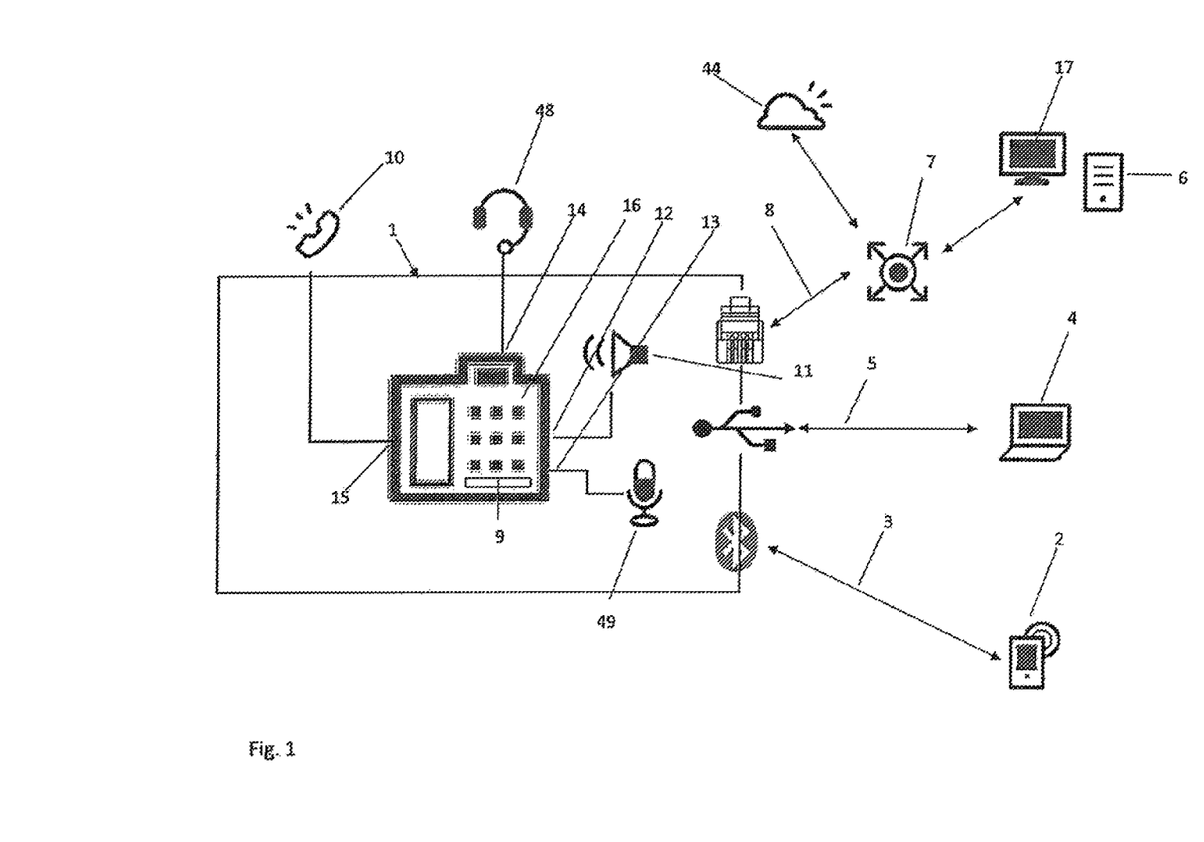
FIG. 1 a schematic representation of a telecommunication terminal according to one embodiment of the invention.

FIG. 1 is a schematic representation of a telecommunication terminal 1 according to one embodiment of the invention. The terminal 1 includes hardware such as a processor connected to a non-transitory computer readable medium (e.g. memory, flash memory, etc.). The terminal 1 can also include at least one transceiver as well as other hardware (e.g. input devices such as a microphone etc., output devices such as a speaker or a display, etc.).

As can be seen here, various terminals, applications, or services running on terminals can be connected in a variety of ways to the telecommunication terminal 1, hereinafter designated as telephone 1. In the configuration shown here, a smart phone 2 is connected to the telephone 1 through a Bluetooth connection 3, a laptop 4 is connected to the telephone 1 through a USB connection 5, a PC 6 is connected to the telephone 1 through the Internet 7, with either a LAN connection or wireless LAN connection 8, and a Web RTC-based cloud service 44, here "Circuit," is also connected or connectable to the telephone 1 through the Internet 7, with either a LAN connection or wireless LAN connection 8, in such a way that the media hub functions of the media hub controller 9, which is integrated into the telephone 1, are used.

The telephone 1 has a customary telephone receiver 10 with a built-in speaker and a built-in microphone, and a room speaker 11 and a room microphone 12 for open listening and hands-free talking without using the receiver 10. In addition, a headset or headphones 48 can be connected to the telephone 1, so that a speaker/microphone pair can be used as a third possibility.

With respect to the terminals connected to the telephone 1 here, the media hub or media hub controller 9 of the telephone 1 acts as a "virtual sound system." Audio playback of audio streams received from the connected terminals takes place on the telephone 1—either on the telephone receiver 10, which has the advantage that others are not bothered in a large office area, for example—or on the headset 13 or room speaker 11. Which of the audio or speaker outputs 12, 13, 14, 15 is selected can be chosen or preset using the media hub controller 9 or entered through a corresponding operator control module 16 of the telephone 1 that controls the media hub controller 9 or can take place implicitly, for example by picking up the receiver 10. In the event that multiple playback processes are active in parallel, they can be mixed by a media processing unit integrated into the telephone 1 (see FIG. 2) and played in parallel.

It is also possible for a microphone in the telephone 1, such as the microphone 49, to be used as the speech input device. These recorded audio streams then flow to all connected terminals 2, 4, 6 and can be used there for recording, for telephoning (e.g., via the smart phone 2 or the cloud service 44), or for other media hub additional functions such as recording or transcribing on the PC 6 or laptop 4.

If a smart phone 2 connected to the telephone 1 via the Bluetooth connection 3 is used, the telephone 1 can direct calls received through the smart phone 2. The Bluetooth "hands-free profile" is used for this, i.e., hanging up, placing, or accepting calls via the smart phone 2 can be done on the telephone 1.

If a WebRTC-based cloud service 44, such as "Circuit," is used on the PC 6, laptop 4, or smart phone 2, the telephone 1 also acts as an amplifier/speaker/microphone unit by means of the "virtual sound system" function mentioned above. Neither an additional PC headset nor a speaker/microphone unit is needed for this. Calls received through the cloud service (e.g., Circuit) 44, for example, can be signaled like normal VoIP calls to the telephone 1 and can also be directly received, forwarded, and ended there.

If an active conversation exists, such as a WebRTC call through "Circuit," additional incoming calls on other terminals, such as the smart phone 2 or telephone 1 itself, can be signaled as busy. If an incoming call is accepted, in actuality a device-overlapping conference session is generated and the data are appropriately mixed on the media processing unit (see FIG. 2) and respectively forwarded via the media hub controller 9.

However, the telephone 1 itself can also be connected to "Circuit"—without a PC 6, laptop 4, or similar device—and thereby make or accept Circuit RTC calls. This has the advantage that it is not necessary to first initiate a Circuit session on the PC 6 or laptop 4, because that device is not yet switched on, for example, and therefore no other Circuit calls are missed. If the user now logs on in parallel to Circuit from a laptop 4 or PC 6 using his access data, he can control the running Circuit-RTC session either from here or from the telephone 1, muting it or hanging up, for example.

In addition, additional "Media Hub" software can be installed on the PC 6, laptop 4, or smart phone 2 that enables additional functions. For example, a recording function can be used there and can be activated or stopped easily as needed on the telephone 1 through the operator control module 16, which is appropriately expanded for that purpose. Recordings are filed in a media hub archive for later use. In addition to audio data, the telephone 1 also delivers voice connection details, including connected subscriber names/numbers and times, etc. An add-on feature of the media hub software can allow transcription, i.e. conversion of audio streams to text data, on the PC 6, laptop 4, or smart phone 2. It converts the spoken audio stream into a text format using external transcription service providers (e.g., "Nuance NDEV" or "Google Cloud Speech"). As with recording, this can easily be started and stopped using the telephone 1 by means of the operator control module 16 attached to it and expanded to allow that function. The resulting text can be saved and archived together with the recording in a corresponding file format. Examples of this would be MP4 or MKV.

Text transcribed in this manner can be very helpful in facilitating searches for information. It is also an advantage for hearing-impaired people, for example, if the transcribed text of a telephone conversation is displayed at the same time on a screen, such as a screen 17 on the PC 6, so that the hearing-impaired person can more easily follow the conversation by reading the displayed text.

Obviously it is also possible for all terminals attached or connected to the telephone 1 to use this service. For example, a call on a smart phone 2, which is connected to the media hub controller 9 and the media processing unit 18 (see FIG. 2) of the telephone 1 through a Bluetooth connection 3, can be recorded or transcribed on the PC 6 or laptop 4 that is also connected. In this case, the audio streams from the smart phone 2 would be forwarded through the telephone 1 to the PC 6 or laptop 4 and then recorded there. The recording that is made can be stored in the memory of the PC 6 or laptop 4, for example.

Alternatively, if an audio playback process is started on the PC 6 that is connected to the telephone 1, such as playing an audio book, and starts the media/audio hub additional functions on the smart phone 2 as described above, then transcription would take place and be displayed there if applicable.

Figure 2:
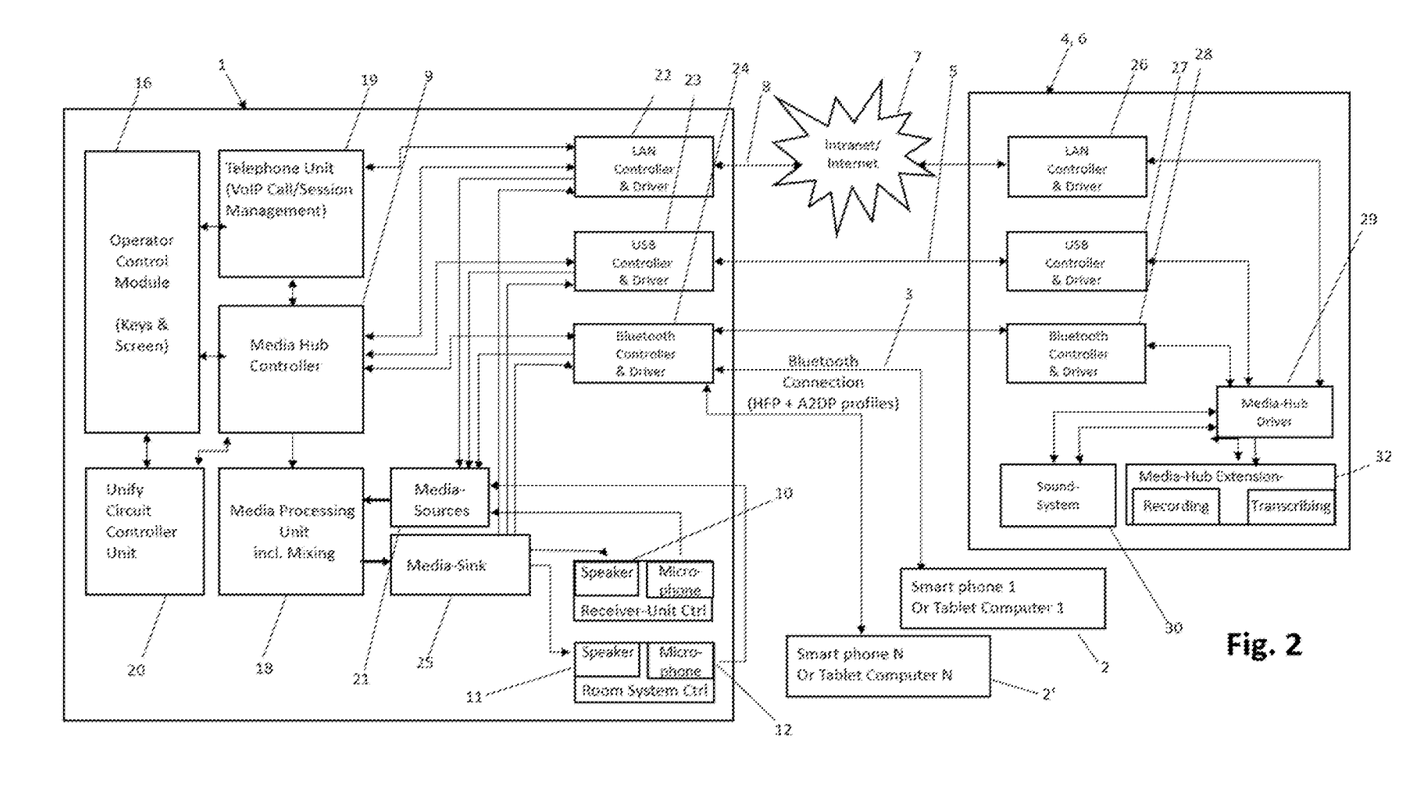
FIG. 2 a flow chart of a telecommunication terminal according to one embodiment of the invention.

FIG. 2 is a flow diagram of a telecommunication terminal or telephone 1 according to one embodiment of the invention. In the configuration shown here, the sequence is controlled entirely by the expanded operator control module 16. Using the operator control module 16, the user can control various functions of the telephone 1 acting as media hub or media bridge, e.g., each of the terminals 2, 4, 6, which can function as media sources 21 or media sinks 25, can be switched actively or passively, for example by means of graphic operation of a touch screen for the operator control module 16. The operator control module 16 includes keys for that, and a screen to display functions and also, for example, for operating the telephone 1, if the screen is equipped as a touch screen, for example. The functions controlled through the operator control module 16 include "Start" and "Stop" for audio recording and text transcription. It is also possible, through the operator control module, to control or set whether audio signals are blocked or whether they should be mixed in the media processing unit 18, which can be the case, for example, if two or more media sources 21 are active in parallel.

In this case the telephone 1 actually also functions as a type of conference bridge between different attached devices, such as the PC 4 or laptop 6, a smart phone 2 or 2', etc., wherein the integrated telephone function of the telephone unit and the Circuit Client function of the Circuit controller unit 20 can also be included as connected terminals.

The media hub of the telephone 1 consists of a media hub controller 9 and a media processing unit 18. The media hub controller 9 handles all the logic and controls the media streams, such as audio streams or video streams, for example. It is also in contact logically with the connected terminals 4, 6, 2, and 2' and sends commands in their direction or receives orders and results from them. The Circuit controller unit 20 controls the connection to the Circuit system. The media hub controller 9 is configured or controlled—as already described above—by the expanded operator control module 16. Audio streams as well as commands and results from/to the attached terminals 2, 2', 4, and 6 are sent and received through the LAN/USB/Bluetooth controller (LAN controller and driver 22, USB controller and driver 23, Bluetooth controller and driver 24), including the respective applicable drivers.

The media sinks designated as 25 in the drawing references are also included in the telephone 1.

The PC 6 or laptop 4 connected to the telephone 1 is also equipped with a LAN/USB/Bluetooth controller (LAN controller and driver 26, USB controller and driver 27, Bluetooth controller and driver 28), a media hub driver 29, a sound system 30, and media hub extension software 32 for recording and transcription.

Figure 3:
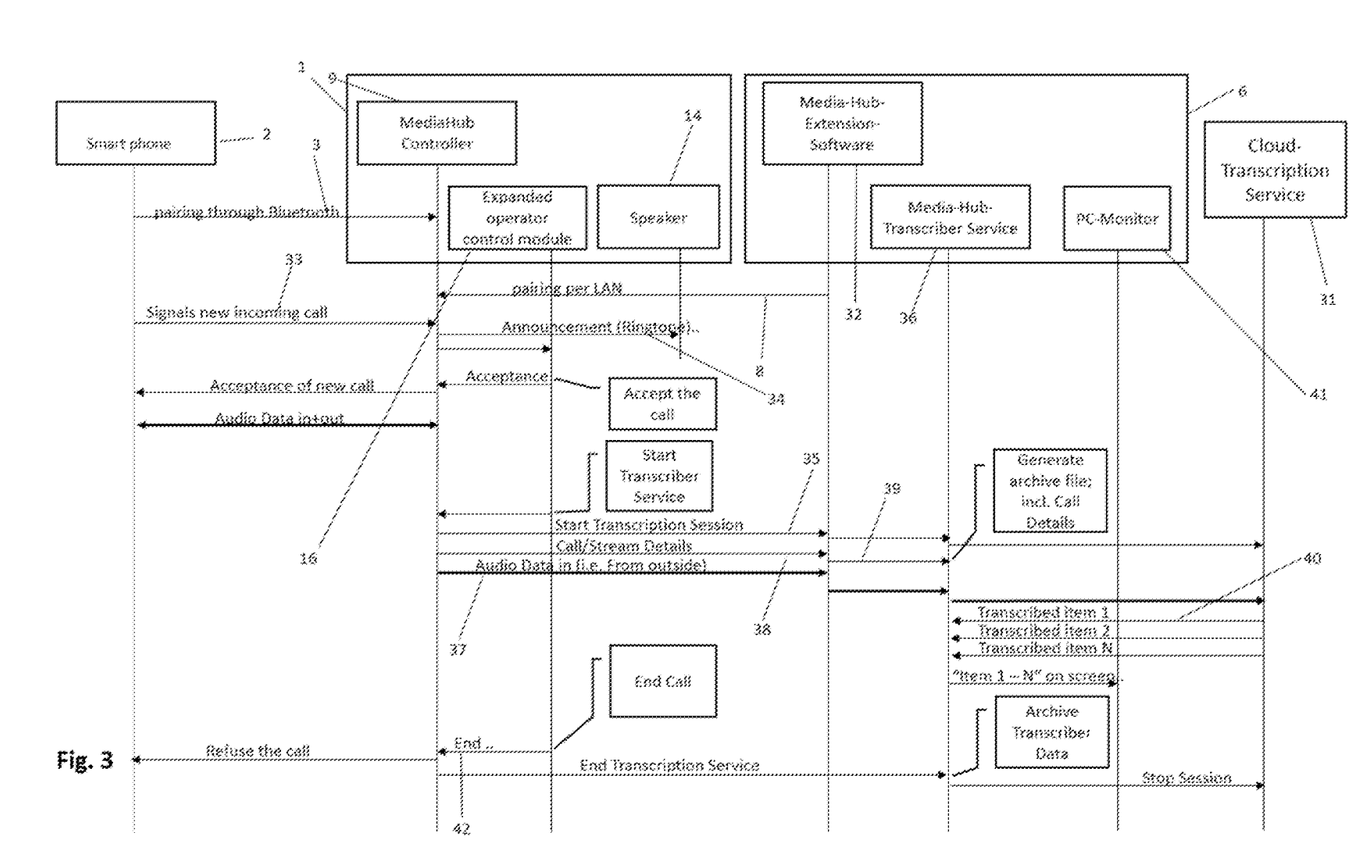
FIG. 3 a sequence diagram for a call from a smart phone.

FIG. 3 is a sequence diagram for a call from a smart phone 2, which is controlled by "Media Hub" and is transcribed and archived using media hub extension software 32 on a connected PC workstation 6.

In this case, the smart phone 2 first executes pairing with the telephone 1 and therefore through the Bluetooth connection 3 with the media hub controller 9 that is integrated into the telephone 1. The media hub controller 9 then executes pairing with the PC 6 and therefore through the LAN connection 8 with the media hub extension software 32 that is installed on the PC 6.

As soon as a new incoming call 33 is signaled by the smart phone 2, the media hub controller 9 announces the call by means of a ring tone 34 that is output from the speaker 14 on the telephone 1. At the same time, the incoming call 33 is signaled to the expanded operator control module 16, after which the incoming call is accepted through the expanded operator control module 16 on the telephone 1, by lifting the receiver 10, for example (see FIG. 1). After the call is accepted, audio data from the smart phone 2 is directed to the media hub controller 9 and from the media hub controller 9 to the smart phone 2.

Then the media hub controller 9 starts a transcription session 35 on the PC 6 through the media hub extension software 32 installed on it. This initiates a media hub transcriber service 36, which access a cloud transcription service 31. The audio data 37 and call details 38 from the smart phone 2, received by the media hub controller 9, are forwarded from there to the media hub extension software 32 on the PC 6, where an archive file 39 for the audio data and call details is created by the media hub extension software 32. The data placed in the archive file are then forwarded to the cloud transcription service 31, which transcribes the audio data, i.e., sends converted and transcribed items 1, 2, . . . N 40 to the PC 6, where the transcribed items 1, 2, . . . N are displayed on a monitor 41 on the PC 6 and are archived by the media hub transcriber service 36.

This process ends when the call 42 is ended through the expanded operator control module 16 on the telephone 1, by hanging up the receiver 10, for example (see FIG. 1), which ends the call coming from the smart phone 2. At the same time, the media hub controller 9 orders the media hub transcriber service 36 on the PC 6 to end the transcription session, which causes the media hub transcriber service 36 to also order the cloud transcription service 31 to end the session.

Figure 4:
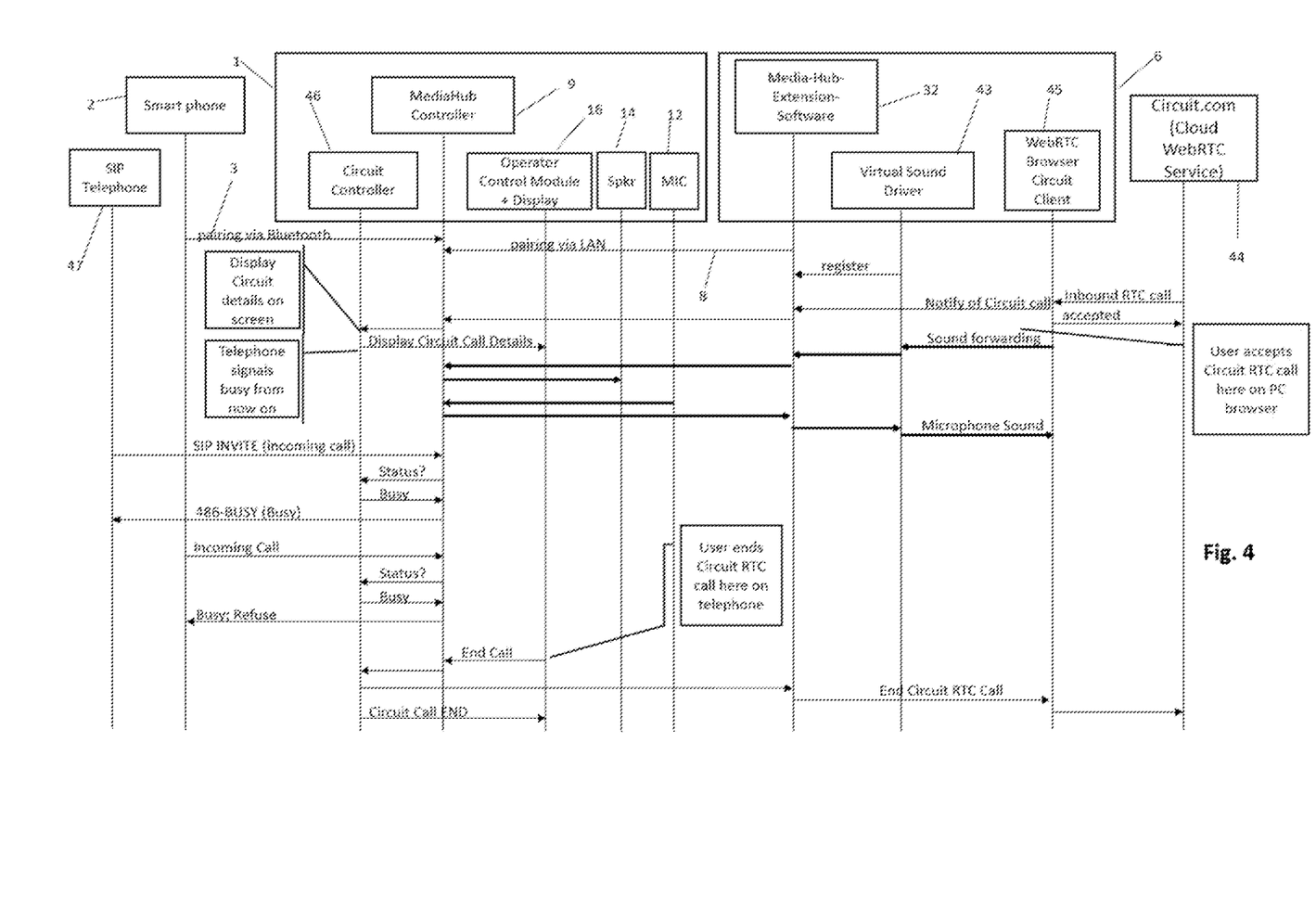
FIG. 4 another sequence diagram for a WebRTC call and additional VoIP and smart phone calls.

FIG. 4 is another sequence diagram for a WebRTC call from a cloud service 44 (cloud WebRTC service) and additional VoIP and smart phone calls. It shows how a Circuit RTC call is handled by the telephone 1 and how additional SIP or smart phone calls can be refused as busy or alternatively can also be accepted and mixed in the telephone 1 by the media processing unit 17.

Here also, the smart phone 2 is paired through a Bluetooth connection 3 with the telephone 1 by its media hub controller 9, which causes the telephone 1 to be paired by its media hub controller 9 with the PC 6 through its media hub extension software 32. Next, a virtual sound driver 43 on the PC 6 is registered on the media hub extension software 32. Through a cloud-based WebRTC service 44, an incoming call on a WebRTC browser 45 on the PC 6 is accepted at the PC 6, and the media hub extension software 32 is notified of the incoming and accepted call. The media hub extension software 32 then notifies the media hub controller 9 on the telephone 1 about the accepted WebRTC call, and the media hub controller 9 notifies a WebRTC controller 46 or Circuit/WebRTC controller 46 about the accepted call. The details of the call are then displayed on a screen, which can be a component of the expanded operator control module 16 on the telephone 1, for example. At the same time, a busy signal is output from the telephone 1.

The WebRTC browser 45 of the PC 6 then forwards recorded audio data (sound playback) of the WebRTC call to the virtual sound driver 43, from which these data are forwarded to the media hub extension software 32 and from there to the media hub controller 9 on the telephone 1, where they are then output on the speaker 14. Audio streams are also received on the microphone 12 of the telephone 1 and forwarded to the media hub controller 9, which then forwards them to the media hub extension software 32 on the PC 6, from which they are sent to the virtual sound driver 43 and from there to the microphone output on the WebRTC browser 45.

During this process, i.e., during the active call, in which the telephone 1 and the PC 6 are participating through the WebRTC service 44, another call comes from the SIP telephone 47 (it can also be a VoIP telephone or a PBX), an (SIP INVITE), which is forwarded to the media hub controller 9. The media hub controller then queries the WebRTC controller 46 for the status, causing it to send a "busy" signal. The media hub controller 9, which receives the "busy" signal, correspondingly forwards it (486-BUSY) to the SIP telephone 47.

The same procedure takes place if a call comes in to the smart phone 2; it is signaled to the media hub controller 9, which again queries the WebRTC controller 46 for the status and receives a "busy" signal, which it signals as "busy" to the smart phone 2 in order to refuse the incoming call on the smart phone 2.

The WebRTC call can be ended by the user via the operator control module 16 on the telephone, for example by pressing a key or hanging up the receiver 10. This informs the media hub controller 9 that the call should be ended. It sends the instruction to end the call to the WebRTC controller 46, which sends a corresponding instruction to the media hub extension software 32 on the PC 6 and notifies the expanded operator control module 16 on the telephone 1, which displays on its integrated screen that the call has been ended. The media hub extension software 32 on the PC sends an instruction to end the WebRTC call to the WebRTC browser 45, which forwards it to the WebRTC service 44 so that the call is then definitively ended on all devices involved.

While certain present preferred embodiments of a communication apparatus, communication system, communication device, communication terminal, non-transitory computer readable medium, and embodiments of methods for making and using the same have been shown and described above, it is to be distinctly understood that the invention is not limited thereto but may be otherwise variously embodied and practiced within the scope of the following claims.

The invention claimed is:

1. A method for controlling media streams comprising:
   receiving, by a telephone, media streams during a call, wherein the media streams comprise audio data;
   forwarding the media streams from the telephone to a telephony-compatible device; wherein the telephony-compatible device is not involved in the call, wherein the telephone controls all connected audio sources or audio sinks and mixes media via a media processing unit;
   causing to generate an archive file, wherein the archive file comprises call details and the audio data from the media streams;
   causing to generate a transcription based on the audio data from the media streams;
   causing to display the transcription during the call; and
   causing to terminate the call in response to receiving input for termination of the call.

2. The method of claim 1, further comprising:
   outputting the media streams through a speaker during the call.

3. The method of claim 1, wherein is a WebRTC call.

4. The method of claim 1, wherein the media streams further comprise video data.

5. The method of claim 1, further comprising:
   causing to display the call details in a display screen.

6. The method of claim 1, further comprising:
   receiving a second call during the call; and
   forwarding a busy signal in response to receiving the second call.

7. The method of claim 1, further comprising:
   receiving recorded audio data of the call, wherein the call is a WebRTC call; and
   outputting the recorded audio data through a speaker during the WebRTC call.

8. A non-transitory, computer-readable medium storing instructions that, when executed by a processor, cause:
   receiving, by a telephone, media streams during a call, wherein the media streams comprise audio data;
   forwarding the media streams from the telephone to a telephony-compatible device; wherein the telephony-compatible device is not involved in the call, wherein the telephone controls all connected audio sources or audio sinks and mixes media via a media processing unit;
   causing to generate an archive file, wherein the archive file comprises call details and the audio data from the media streams;
   causing to generate a transcription based on the audio data from the media streams;
   causing to display the transcription during the call; and
   causing to terminate the call in response to receiving input for termination of the call.

9. The non-transitory, computer-readable medium of claim 8, storing further instructions that, when executed by the processor, cause:
   outputting the media streams through a speaker during the call.

10. The non-transitory, computer-readable medium of claim 8, wherein the call is a WebRTC call.

11. The non-transitory, computer-readable medium of claim 8, wherein the media streams further comprise video data.

12. The non-transitory, computer-readable medium of claim 8, storing further instructions that, when executed by the processor, cause:

causing to display the call details in a display screen.

13. The non-transitory, computer-readable medium of claim 8, storing further instructions that, when executed by the processor, cause:

receiving a second call during the call; and forwarding a busy signal in response to receiving the second call.

14. The non-transitory, computer-readable medium of claim 8, storing further instructions that, when executed by the processor, cause:

receiving recorded audio data of the call, wherein the call is a WebRTC call; and outputting the recorded audio data through a speaker during the WebRTC call.

15. A system for controlling media streams comprising:

a telephone configured to:

receive media streams during a call, wherein the media streams comprise audio data; and forward the media streams to a telephony-compatible device, wherein the telephone controls all connected audio sources or audio sinks and mixes media via a media processing unit; and the telephony-compatible device configured to:

receive from the telephone, the media streams during the call, wherein the telephony-compatible device is not involved in the call;

generate an archive file, wherein the archive file comprises call details and the audio data from the media streams;

generate a transcription based on the audio data from the media streams;

display the transcription during the call; and terminate the call in response to receiving input for termination of the call.

16. The system of claim 15, wherein the telephony-compatible device is further configured to:

output media streams through a speaker during the call.

17. The system of claim 15, wherein the call is a WebRTC call.

18. The system of claim 15, wherein the media streams further comprise video data.

19. The system of claim 15, wherein the telephone is further configured to:

receive a second call during the call; and forward a busy signal in response to receiving the second call.

20. The system of claim 15, wherein the telephony-compatible device is further configured to:

receive recorded audio data of the call, wherein the call is a WebRTC call; and output the recorded audio data through a speaker during the WebRTC call.

* * * * *